(12) United States Patent
Nobe

(10) Patent No.: US 6,327,055 B1
(45) Date of Patent: Dec. 4, 2001

(54) IMAGE FORMING APPARATUS AND IMAGE READING APPARATUS

(75) Inventor: Hiroshi Nobe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/153,328

(22) Filed: Sep. 15, 1998

(30) Foreign Application Priority Data

Sep. 18, 1997 (JP) .................................................. 9-253291

(51) Int. Cl.[7] ...................................................... H04N 1/04
(52) U.S. Cl. ............................ 358/474; 399/53; 271/160; 355/33
(58) Field of Search ................................... 358/474, 482, 358/298, 475, 496; 399/53–55, 285, 274; 271/160, 252; 355/33

(56) References Cited

U.S. PATENT DOCUMENTS

| | | | |
|---|---|---|---|
| 5,895,157 | * | 4/1999 | Morimura et al. .................... 400/206 |
| 5,903,401 | * | 5/1999 | Tanaka .................................. 359/806 |
| 6,236,818 | * | 6/2001 | Endo ....................................... 399/55 |

* cited by examiner

Primary Examiner—Jerome Grant, II
Assistant Examiner—Negussie Worku
(74) Attorney, Agent, or Firm—Oliff & Berridge, PLC

(57) ABSTRACT

An image forming apparatus is provided with: a main body unit including a controller and an image forming device for forming an image on a record medium under a control of the controller, and having an attachment portion; a detachable record medium supplying unit detachably attached to the attachment portion and including a record medium accommodation device for accommodating the record medium and a record medium transporting device for transporting the record medium from the record medium accommodation device; and a detachable image reading unit detachably attached to the attachment portion instead of the detachable record medium supplying unit and including a reading device for reading image information on an original and an original transporting device for transporting the original to the reading device.

12 Claims, 12 Drawing Sheets

IMAGE FORMING APPARATUS AND IMAGE READING APPARATUS

BACKGROUND OF THE INVENTION

1. Field of the Invention

The present invention relates to an image forming apparatus, which has a plurality of record medium supplying units such as detachable paper supplying trays or the like, and on which an image reading apparatus can be attached or mounted at a position where the paper supplying tray is detached, and the image reading apparatus.

2. Description of the Related Art

There is an image forming system by use of a personal computer, in which a printer is connected to the personal computer. As one type of such an image forming system, there is a system in which an exclusive image reading apparatus separated from the printer is connected to the personal computer in order to read an image printed on a sheet, a photograph or the like.

In order to improve simplifying and space-saving the image forming system as a whole, there is a system using a serial printer in which an image reading apparatus is attached to a printer head portion.

However, in case that the above mentioned exclusive image reading apparatus is employed, there is such a problem that it is necessary to ensure a layout space for the image reading apparatus besides a layout space for the printer.

Further, in case that the exclusive image reading apparatus is added to the image forming system consisting of the personal computer and the printer, there is such a problem that an initial setting up operation becomes troublesome as a cable for the image reading apparatus should be connected to a connector provided on a rear portion of the personal computer, a power supply for the image reading apparatus is ensured and so on.

By employing a printer on which the image reading apparatus is mounted on the printer head portion thereof, the above explained problems of the space and the connecting operation etc., may be solved. However, in this case, there is such a problem for the user, who has already purchased the printer, that it is necessary to replace the existing printer with a new type, resulting in a significant loss.

Furthermore, there is such a problem for the maker, who manufactures the printers, that there are raised a large number of changing points on the structure with respect to the printer of the type which has been manufactured, resulting in a significant increase of the cost in case of mounting the image reading apparatus on the printer head portion.

SUMMARY OF THE INVENTION

The present invention is proposed in view of the above mentioned problems. It is therefore an object of the present invention to provide an image forming apparatus and an image reading apparatus, which requires no or little extra space and no or little troublesome connecting operation and which can efficiently use hardware resources even in case of adding the image reading apparatus to an existing image forming system.

The above object of the present invention can be achieved by a first image forming apparatus provided with: a main body unit including a controller and an image forming device for forming an image on a record medium under a control of the controller, and having an attachment portion; a detachable record medium supplying unit detachably attached to the attachment portion and including a record medium accommodation device for accommodating the record medium and a record medium transporting device for transporting the record medium from the record medium accommodation device; and a detachable image reading unit detachably attached to the attachment portion instead of the detachable record medium supplying unit and including a reading device for reading image information on an original and an original transporting device for transporting the original to the reading device.

According to the first image forming apparatus, when the detachable record medium supplying unit is attached to the attachment portion of the main body unit, the record medium accommodated in the record medium accommodation device is transported by the record medium transporting device, on the side of the detachable record medium supplying unit. Then, the record medium is supplied from the detachable record medium supplying unit to the main body unit. Then, the image is formed on the supplied record medium by the image forming device under the control of the controller, on the side of the main body unit. On the other hand, when the detachable record medium supplying unit is detached and, instead of it, the detachable image reading unit is attached to the attachment portion of the main body unit, the original is transported by the original transporting device. Then, the image information on the original is read by the reading device.

Accordingly, in case of attaching the detachable record medium supplying unit to the attachment portion, a normal image forming process is performed. On the other hand, in case of attaching the detachable image reading unit to the attachment portion, an image reading process is performed.

In this manner, since the detachable image reading unit, which can be attached and detached to the attachment portion for the detachable record medium supplying unit and which can exchange the record medium supplying unit, is employed, it is possible to reduce the layout space for the image reading apparatus and also omit a troublesome connection operation.

In one aspect of the first image forming apparatus, the first image forming apparatus is further provided with: a driving device for driving the record medium transporting device by engaging with the record medium transporting device when the detachable record medium supplying unit is attached to the attachment portion, and for driving the original transporting device by engaging with the original transporting device when the detachable image reading unit is attached to the attachment portion.

According to this aspect, when the detachable record medium supplying unit is attached to the attachment portion, the record medium transporting device is engaged with the driving device. Then, the record medium transporting device is driven by the driving device to transport the record medium. On the other hand, when the detachable image reading unit is attached to the attachment portion, the original transporting device is engaged with the driving device. Then, the original transporting device is driven by the driving device to transport the original. Accordingly, by commonly use the driving device in this manner, the structure of the image reading unit as well as the image forming apparatus on the whole can be simplified, and the cost can be reduced.

In another aspect of the first image forming apparatus, at least one of the detachable record medium supplying unit and the detachable image reading unit comprises an identification device, and the controller identifies whether the detachable record medium supplying unit or the detachable image reading unit is attached to the attachment portion on the basis of the identification device.

According to this aspect, when the detachable record medium supplying unit or the detachable image reading unit is attached to the attachment portion, the attached unit can be identified by the identification device. Therefore, it is possible to perform the process appropriate for the attached unit in the image forming apparatus.

In another aspect of the first image forming apparatus, the first image forming apparatus is further provided with at least one non-detachable record medium supplying unit fixedly attached to the main body unit at a position other than the attachment portion. The controller controls the image forming device to form the image on the record medium supplied from the non-detachable record medium supplying unit on the basis of the image information read by the reading device when the detachable image reading unit is attached to the attachment portion.

According to this aspect, when the detachable image reading unit is attached to the attachment portion and the image reading process is started by the reading device, the image is formed on the record medium, which is supplied from the non-detachable record medium supplying unit, by the image forming device under the control of the controller. As a result, the copy image of the original can be speedily outputted by the image forming apparatus.

In this aspect, the controller may perform a process of inputting image data from the detachable image reading unit and a process of controlling the image forming device to form the image based on the inputted image data in a time-sharing manner.

According to this aspect, since the process of inputting image data and the process of controlling the image forming device to form the image are performed in the time-sharing manner under the control of the controller, the image forming apparatus can be efficiently utilized on the whole.

The above object of the present invention can be also achieved by a second image forming apparatus provided with: a controller; an image forming device for forming an image on a record medium under a control of the controller; and a main body case for accommodating the controller and the image forming device and having an attachment portion to which a detachable record medium supplying unit and a detachable image reading unit can be alternatively and detachably attached. The detachable record medium supplying unit includes a record medium accommodation device for accommodating the record medium and a record medium transporting device for transporting the record medium from the record medium accommodation device. The detachable image reading unit includes a reading device for reading image information on an original and an original transporting device for transporting the original to the reading device.

According to the second image forming apparatus, when the detachable record medium supplying unit is attached to the attachment port ion of the main body case, the record medium accommodated in the record medium accommodation device is transported by the record medium transporting device. Then, the record medium is supplied from the detachable record medium supplying unit to the image forming device in the main body case. Then, the image is formed on the supplied record medium by the image forming device under the control of the controller. On the other hand, when the detachable record medium supplying unit is detached and the detachable image reading unit is attached to the attachment portion of the main body case, the original is transported by the original transporting device. Then, the image information on the original is read by the reading device.

Accordingly, in case of attaching the detachable record medium supplying unit to the attachment portion, a normal image forming process is performed. On the other hand, in case of attaching the detachable image reading unit to the attachment portion, an image reading process is performed.

In this manner, since the attachment portion of the main body case is constructed such that either one of the detachable image reading unit and the detachable record medium supplying unit can be alternatively attached thereto, it is possible to perform both of the image forming process and the image reading process by use of just one image forming apparatus, so that the simplification and the layout space saving of the image forming apparatus can be improved. In addition, since the attachment portion is commonly used for the detachable image reading unit and the detachable record medium supplying unit, the attaching operation of the detachable image reading unit can be easily performed, i.e., the troublesome connecting operation of the image reading apparatus can be omitted. Further, since either one of the detachable record medium supplying unit and the detachable image reading unit can be selectively attached, it is possible to provide an image forming system in line with the user's wish.

In one aspect of the second image forming apparatus, the second image forming apparatus is further provided with: a driving device for driving the record medium transporting device by engaging with the record medium transporting device when the detachable record medium supplying unit is attached to the attachment portion, and for driving the original transporting device by engaging with the original transporting device when the detachable image reading unit is attached to the attachment portion.

According to this aspect, when the detachable record medium supplying unit is attached to the attachment portion, the record medium transporting device is engaged with the driving device. Then, the record medium transporting device is driven by the driving device to transport the record medium. On the other hand, when the detachable image reading unit is attached to the attachment portion, the original transporting device is engaged with the driving device. Then, the original transporting device is driven by the driving device to transport the original. Accordingly, by commonly use the driving device in this manner, the structure of the image reading unit as well as the image forming apparatus on the whole can be simplified, and the cost can be reduced.

In another aspect of the second image forming apparatus, at least one of the detachable record medium supplying unit and the detachable image reading unit comprises an identification device, and the controller identifies whether the detachable record medium supplying unit or the detachable image reading unit is attached to the attachment portion on the basis of the identification device.

According to this aspect, when the detachable record medium supplying unit or the detachable image reading unit is attached to the attachment portion, the attached unit can be identified by the identification device. Therefore, it is possible to perform the process appropriate for the attached unit in the image forming apparatus.

In another aspect of the second image forming apparatus, the second image forming apparatus is further provided with at least one non-detachable record medium supplying unit fixedly attached to the main body case at a position other than the attachment portion. The controller controls the image forming device to form the image on the record medium supplied from the non-detachable record medium supplying unit on the basis of the image information read by the reading device when the detachable image reading unit is attached to the attachment portion.

According to this aspect, when the detachable image reading unit is attached to the attachment portion and the image reading process is started by the reading device, the image is formed on the record medium, which is supplied from the non-detachable record medium supplying unit, by the image forming device under the control of the controller. As a result, the copy image of the original can be speedily outputted by the image forming apparatus. Further, since the non-detachable record medium supplying unit is fixedly attached, it is possible to use the image forming apparatus by itself, such that the image reading unit can be utilized as an optional apparatus. Therefore, it is possible to expand the image forming system with a relatively low cost in line with the user's wish.

The above object of the present invention can be also achieved by an image reading apparatus, which can be detachably attached to an attachment portion of an image forming apparatus instead of a detachable record medium supplying unit, the image forming apparatus including a controller and an image forming device for forming an image on a record medium under a control of the controller, the detachable record medium supplying unit detachably attached to the attachment portion and including a record medium accommodation device for accommodating the record medium and a record medium transporting device for transporting the record medium from the record medium accommodation device. The image reading apparatus is provided with: a reading device for reading image information on an original: an original transporting device for transporting the original to the reading device: and an attachment device for attaching the image reading apparatus to the attachment portion.

According to the image reading apparatus, when the detachable record medium supplying unit is detached and, instead of it, the image reading apparatus is attached by the attachment device to the attachment portion of the information forming apparatus, the original is transported by the original transporting device. Then, the image information on the original is read by the reading device. In this manner, in the image forming apparatus in which a normal image forming operation is performed in case of attaching the detachable record medium supplying unit to the attachment portion, the image reading operation can be performed by attaching the image reading apparatus in place of the detachable record medium supplying unit.

In this manner, since the image reading apparatus can be detachably attached to the attachment portion for the detachable record medium supplying unit of the image forming apparatus, it is possible to use one image-forming apparatus not only as an apparatus for performing the image-forming operation but also as an apparatus for performing the image-reading operation. Hence, the simplification and the layout space saving of the image forming apparatus can be improved. In addition, since the attachment portion is commonly used for the image reading apparatus and the detachable record medium supplying unit, the attaching operation of the image reading apparatus can be easily performed, i.e., the troublesome connecting operation of the image reading apparatus can be omitted. Further, even in case that the image forming apparatus has been already purchased, it is easy for the user to add the image reading apparatus later thereto. Hence, it is possible to provide an appropriate image forming system in line with the user's wish.

In one aspect of the image reading apparatus, the original transporting device is engaged with and is driven by a driving device of the image forming apparatus when the attachment device is attached to the attachment portion.

According to this aspect, when the image reading apparatus is attached to the attachment portion of the image forming apparatus, the original transporting device is engaged with the driving device installed to the image forming apparatus. Then, the original transporting device is driven by the driving device to transport the original. Namely, it is possible to drive the original transporting device without installing the driving device to the image reading apparatus for itself, so that the structure of the image reading apparatus can be simplified and the cost can be reduced.

In another aspect of the image reading apparatus, the image reading apparatus is further provided with an identification device for identifying the image reading apparatus from the detachable record medium supplying unit when the attachment device is attached to the attachment portion.

According to this aspect, by virtue of the identification device, it is possible for the image forming apparatus (e.g., the controller thereof) to identify or distinguish the image reading apparatus from the detachable record medium supplying unit. As a result, it is possible to perform the process appropriate for the attached apparatus or unit in the image forming apparatus.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

A preferred embodiment of the present invention is explained with reference to the drawings.

At first, a whole structure of the embodiment in a condition that paper supplying tray units are attached to a main body of a laser beam printer will be explained with reference to FIG. 1 to FIG. 3.

Figure 1:
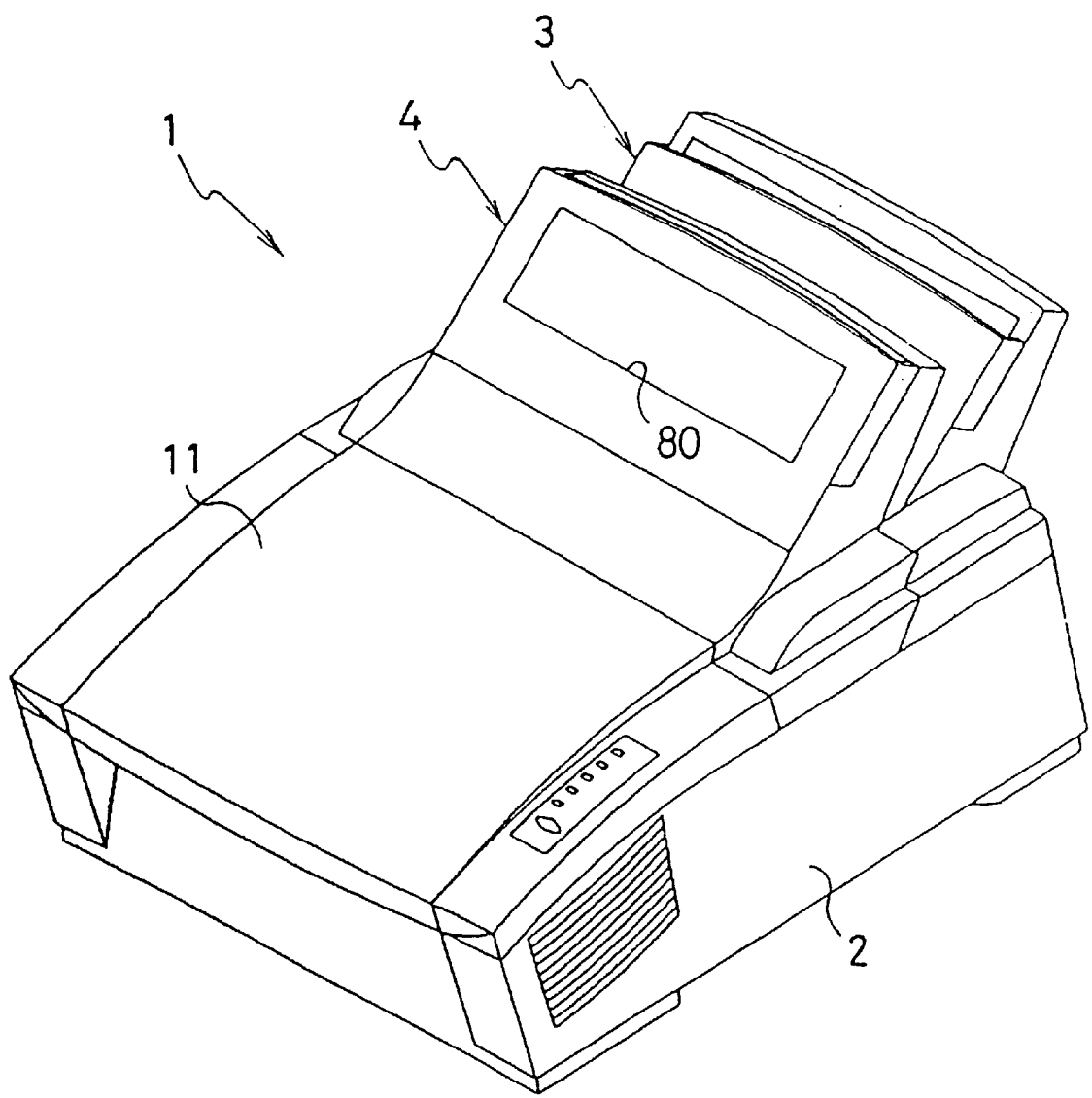
FIG. 1 is a perspective view showing an appearance of a laser beam printer of an embodiment.
Figure 2:
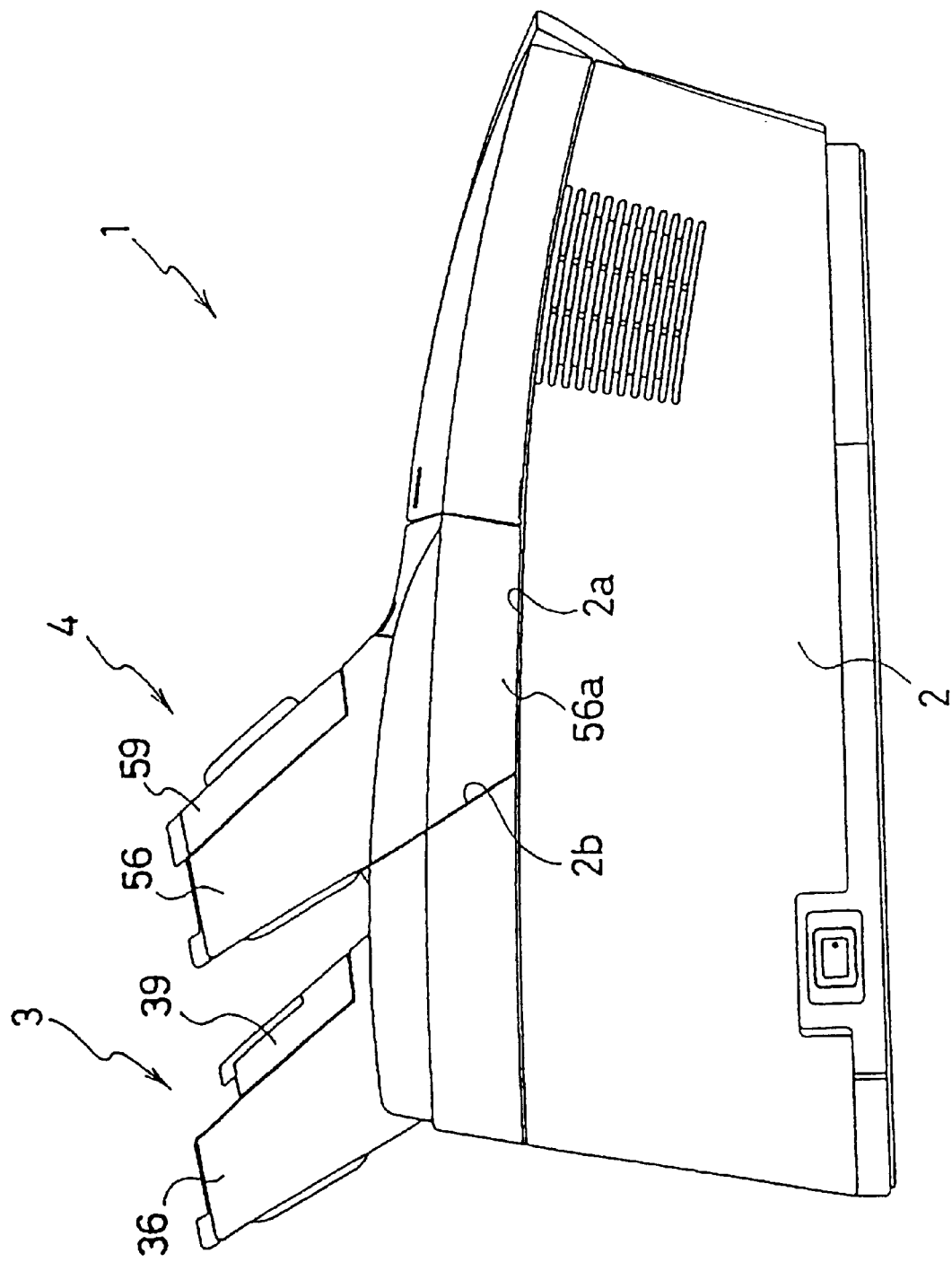
FIG. 2 is a side view of the laser beam printer of FIG. 1.
Figure 3:
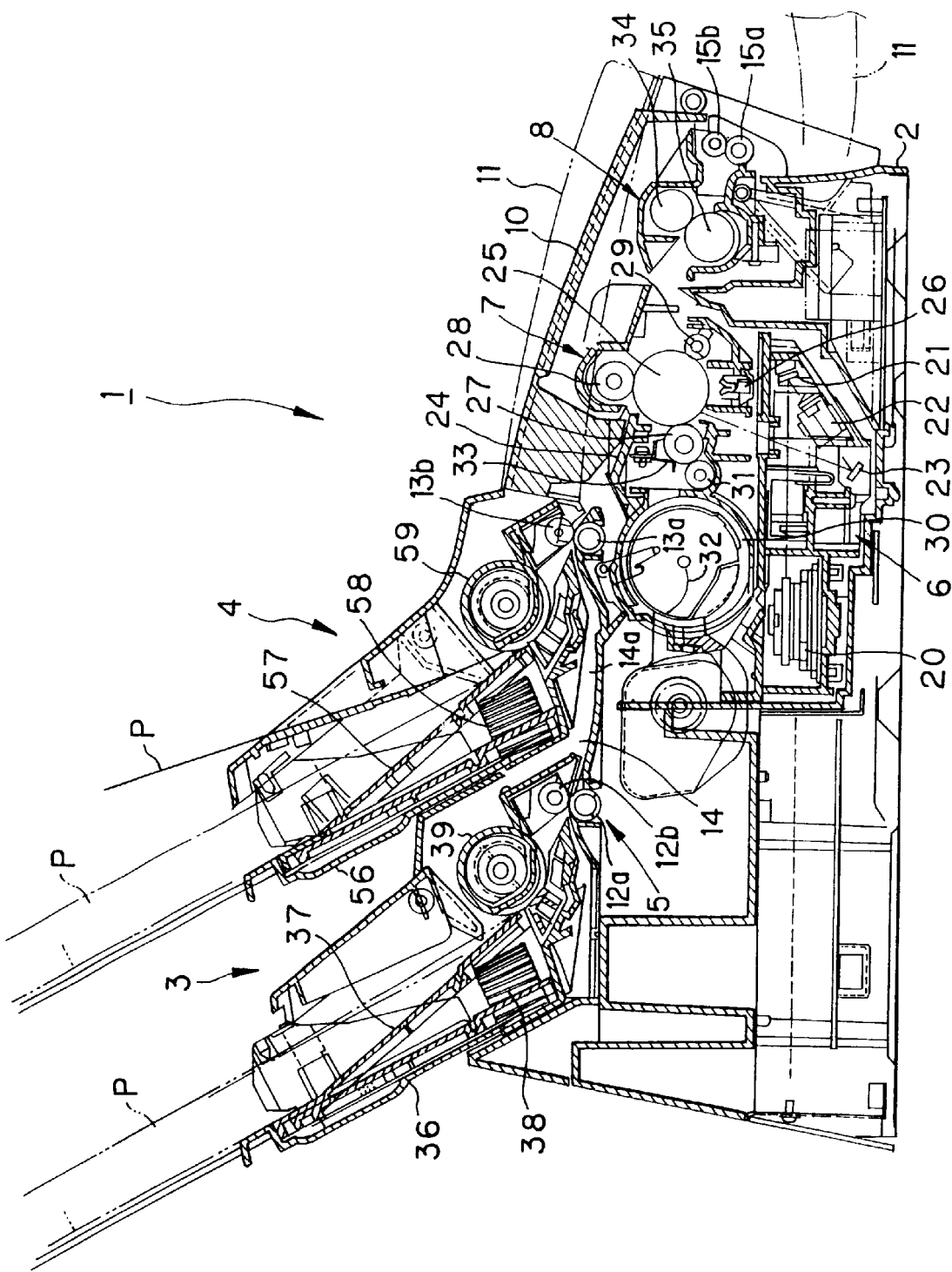
FIG. 3 is a cross sectional view showing a configuration of the laser beam printer of FIG. 1.

In FIG. 1 to FIG. 3, a laser beam printer 1 of the embodiment is provided with: a main body case 2; a first paper supplying tray unit 3 and a second paper supplying tray unit 4 each servicing as one example of a record medium supplying unit for supplying a paper P as one example of a record medium for image formation: a paper transporting mechanism 5 disposed within the main body case 2; a scanner unit 6 for exposing a photosensitive drum 25; a process unit 7 having the photosensitive drum 25 for sequentially performing processes such as a developing process, a toner transferring process, a toner recovering process and so on; a fixing unit 8 for fixing a transferred image of toners which has been transferred from the photosensitive drum 25 onto the paper P; and a driving unit (not shown) accommodated in a rear portion of the main body case 2 (i.e., a left side portion in FIG. 3) for driving a driving mechanism in each unit.

Hereinbelow, each unit or section will be explained in detail. At first, the image forming section in the present embodiment is provided with the process unit 7, the scanner unit 6 and the fixing unit 8.

As shown in FIG. 3, the process unit 7 has a detachable cartridge structure which can be attached and detached at a predetermined attachment portion in the main body case 2, and which accommodates the photosensitive drum 25, a SCOROTORON type electric charger 26, a developing roller 27, a transfer roller 28, a cleaning roller 29, a toner box 30, a toner supplying roller 31 and so on in a casing 24. It is constructed to supply the toners into the toner box 30 in a condition that the process unit 7 is detached from the main body case 2. The toners stored in the toner box 30 in this manner are agitated and discharged by an agitator 32, are then supplied to the developing roller 27 through the toner supplying roller 31, and are carried by the developing roller 27 as a toner layer having a constant thickness by a blade 33 to be supplied to the photosensitive drum 25.

The scanner unit 6 is disposed under the process unit 7, and is provided with a laser emitting portion (not illustrated), a polygon mirror 20, a reflection mirrors 21 and 23, a lens 22 and so on. The laser beam from the laser emitting portion in the scanner unit 6 is irradiated by a high speed scanning operation onto an outer circumferential portion of the photosensitive drum 25, which is electrically charged and rotated, of the process unit 7 through the polygon mirror 20, the reflection mirror 21, the lens 22 and the reflection mirror 23 as indicated by a dashed line in FIG. 3, so that an electrostatic latent image is formed on a surface of the photosensitive drum 25 by exposing the photosensitive drum 25.

The electrostatic latent image formed on the photosensitive drum 25 is image-formed by attaching the toners from the developing roller 27. Then, the toner image formed on the photosensitive drum 25 is transferred onto the paper P while the paper P is transported between the photosensitive drum 25 and the transfer roller 28. Then, the paper P is transported into the fixing unit 8, where the transferred toner image is fixed on the paper P.

Incidentally, the toners which remain on the photosensitive drum 25 are temporarily recovered by the cleaning roller 29, and are recovered by the developing roller 27 via the photosensitive drum 25 at a predetermined timing.

The fixing unit 8 is to heat-fix the toners on the paper P, and is provided with: a heating roller 34; a pressure roller 35 which is pressurized against the heating roller 34; and a pair of discharging rollers 15a and 15b disposed on the downstream side of these rollers 34 and 35 for discharging the paper P to the external of the main body case 2.

On the other hand, a top cover 10, which can be opened at the upper surface side of the print mechanical portion, and a paper discharging tray 11 are provided on the front upper portion of the main body case 2. The paper discharging tray 11 is constructed such that the position thereof is switched to a closed position indicated by a solid line and an open position indicated by a dashed line, and that it functions as a tray for receiving the paper which has been printed when it is at the open position.

The first paper supplying tray unit 3 is provided with: a tray case 36 which can accommodate a plurality of papers P in a backward-raised and inclined state; a paper receiving plate 37 which is disposed at the bottom of the tray case 36 and receives the bottom side of the papers P; a compressed coil spring 38 for forward pushing the paper receiving plate 37; and a paper supplying roller 39, and is fixedly attached to an upper surface portion of the main body case 2 at the vicinity of the rear edge thereof.

On the other hand, the second paper supplying tray unit 4 is provided with: a tray case 56 as one example of a record medium storage device which can accommodate a plurality of papers P in a backward-raised and inclined state; a paper receiving plate 57 which is disposed at the bottom of the tray case 56 and receives the bottom side of the papers P; a compressed coil spring 58 for forward pushing the paper receiving plate 57; and a paper supplying roller 59 as one example of a record medium transporting device, and is detachably attached to an upper surface portion of the main body case 2 as an attachment portion at the vicinity of the front edge thereof.

The paper transporting mechanism 5 transports the paper P alternatively transported from the first paper supplying tray unit 3 and the second paper supplying tray unit 4 to the process unit 7, and is provided with a pair of transporting rollers 12a and 12b disposed on the lower end side of the first paper supplying tray unit 3, and a pair of resist rollers 13a and 13b disposed on the lower end side of the second paper supplying tray unit 4. Among them, the transporting roller 12a is a driving roller, and the transporting roller 12b is a driven roller. Further, the resist roller 13a is a driving roller, and the resist roller 13b is a driven roller. A paper transporting path 14 from the first paper supplying tray unit 3 to the resist rollers 13a and 13b includes a bottom side transporting path 14a extending along the bottom surface of the second paper supplying tray unit 4. Then, the bottom side transporting path 14a becomes in an externally-opened state in the condition that the second paper supplying tray unit 4 is detached from the main body case 2.

The paper P from the first paper supplying tray unit 3 is transported by the transporting rollers 12a and 12b, is passed on the bottom side transporting path 14a, and arrives at the resist rollers 13a and 13b. After the resist, the paper P is transported to the process unit 7. On the other hand, the paper P transported from the second paper supplying tray unit 4 arrives at the resist rollers 13a and 13b. After the resist, the paper P is transported to the process unit 7.

Next, the second paper supplying tray unit 4 as one example of an detachable record medium supplying unit is adapted to be detached from the main body case 2 in order to perform a process against the paper jam.

Figure 4:
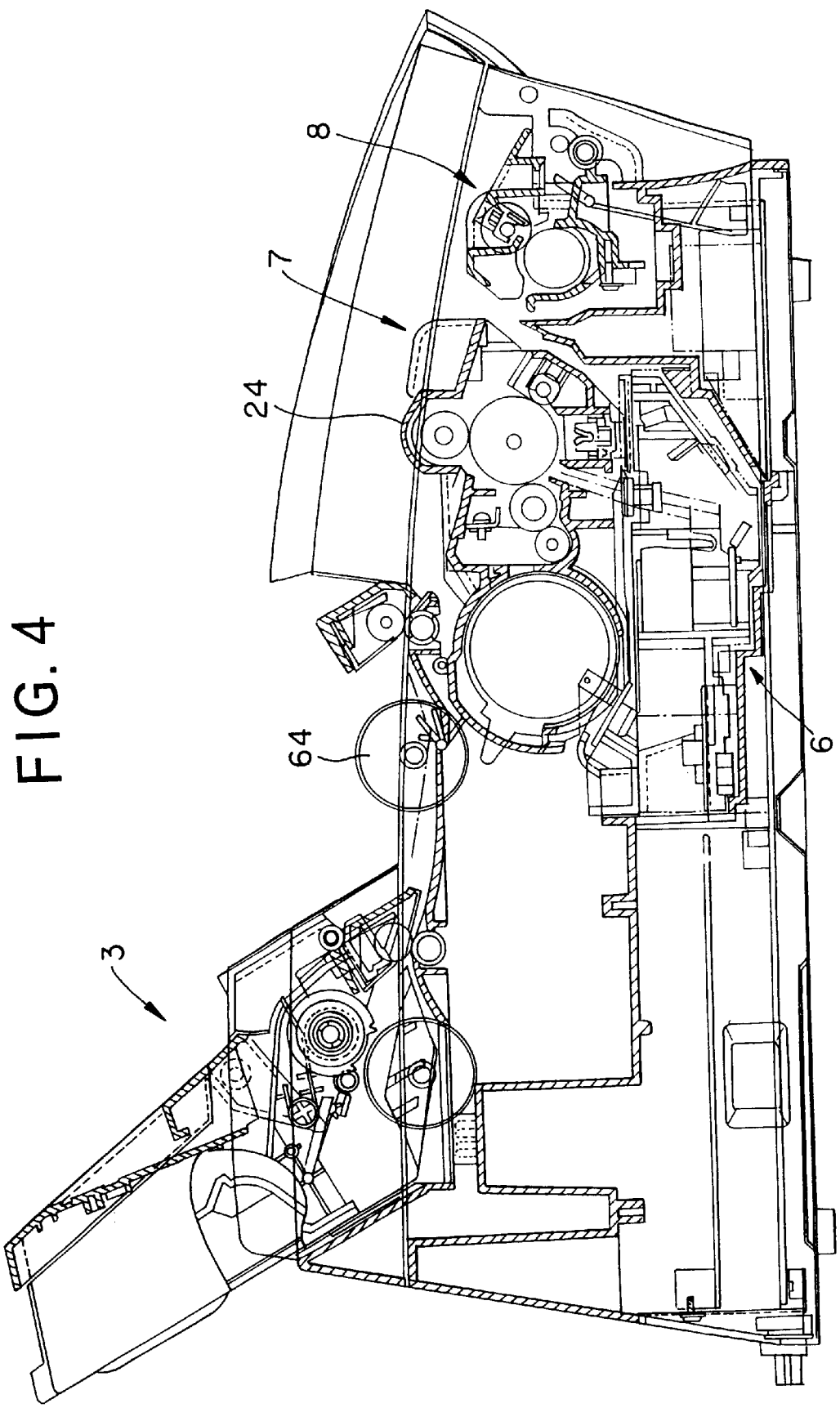
FIG. 4 is across sectional view showing a configuration of the laser beam printer of FIG. 1 in a condition that a second paper supplying tray unit is detached.

FIG. 4 shows the laser beam printer I in a condition that the second paper supplying tray unit 4 is detached. In this condition, the driving gear 64 for transmitting the driving force from the main body case 2 is exposed. The process against the paper jam of the paper P supplied from the first paper supplying tray unit 3 is performed in a condition that the second paper supplying tray unit 4 or an image reading unit 40 described later is detached from the main body case 2.

Figure 5:
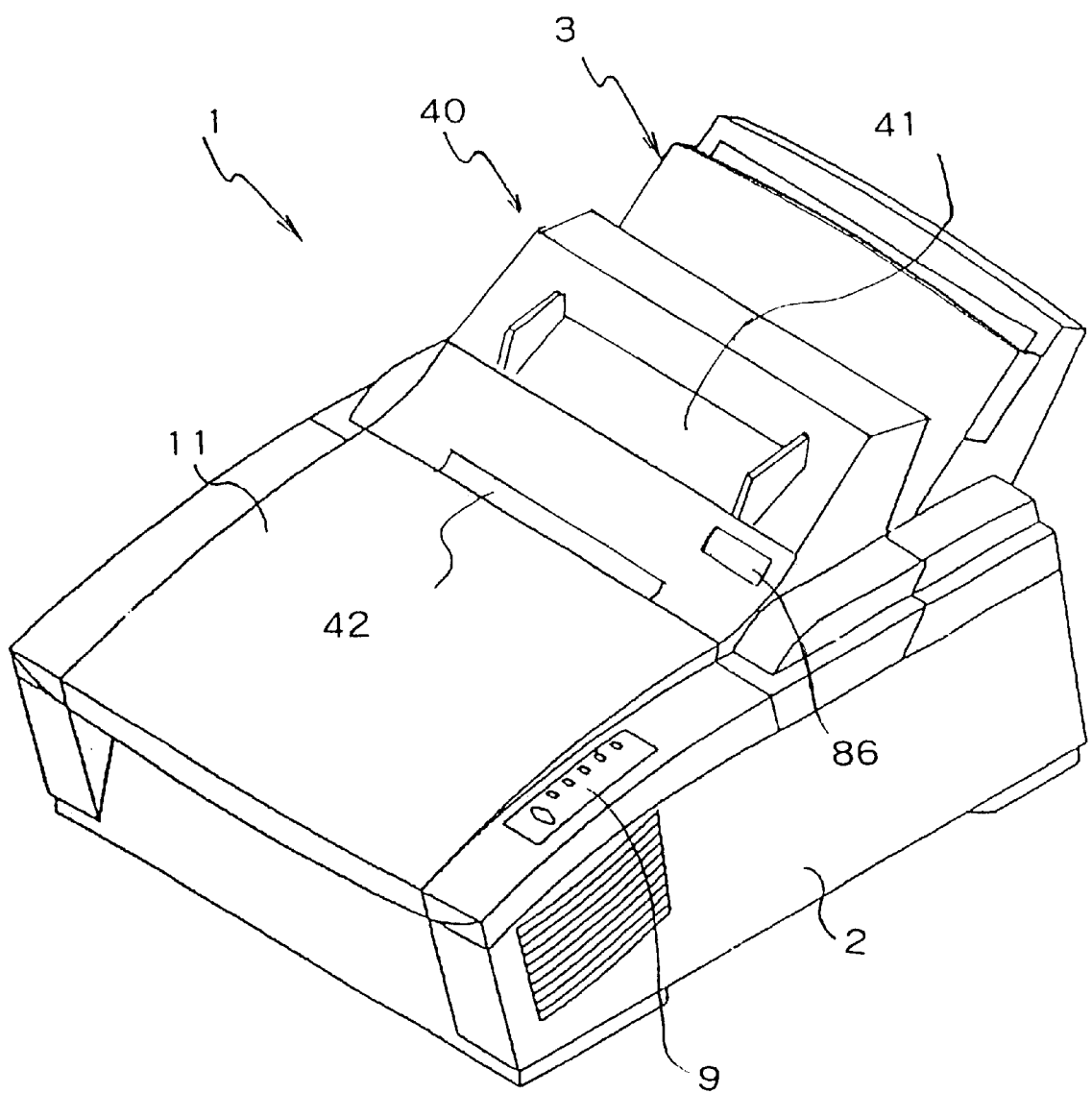
FIG. 5 is a perspective view showing an appearance of the laser beam printer of FIG. 1 in a condition that an image reading unit is attached.
Figure 6:
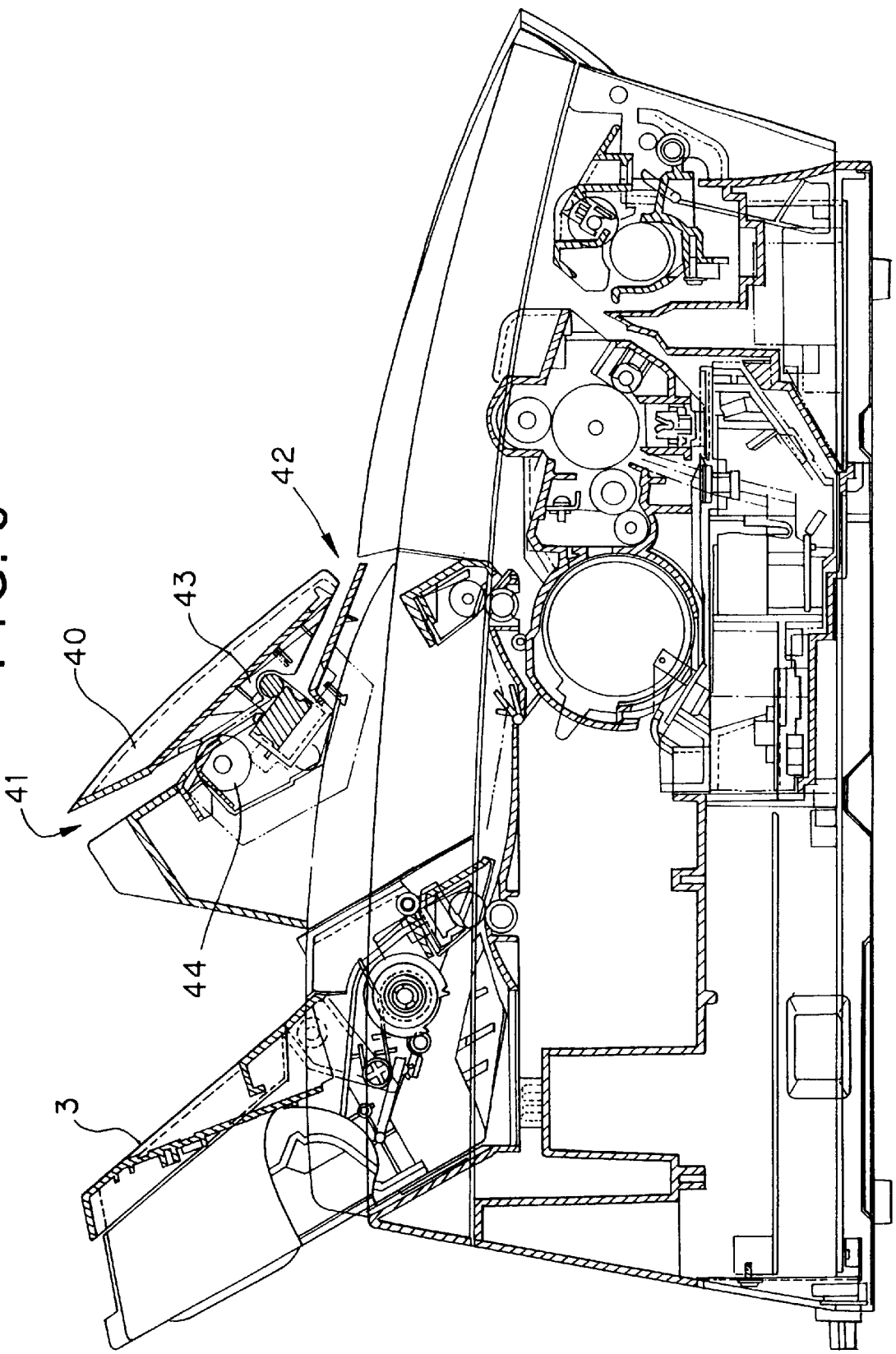
FIG. 6 is a cross sectional view of the laser beam printer of FIG. 1 in a condition that an image reading unit is attached.
Figure 7:
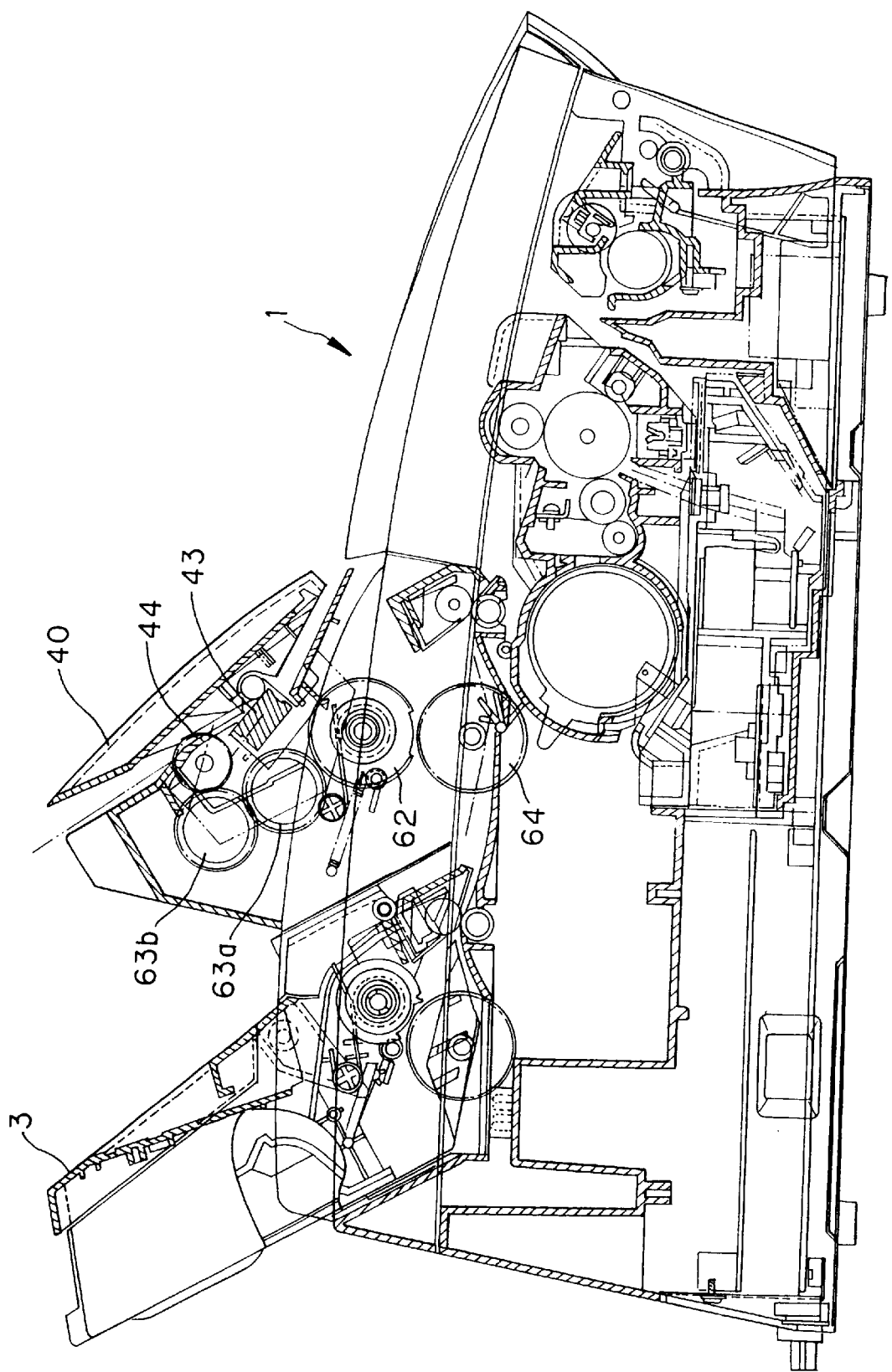
FIG. 7 is a cross sectional view showing a relationship between a driving gear transmission train in the image reading unit and a driving gear in the laser beam printer of FIG. 6.

By utilizing such a detachable construction of the second paper supplying tray unit 4, the present embodiment is constructed such that the image reading unit 40 can be attached to an attachment portion for the second paper supplying tray unit 4, as shown in FIG. 5 to FIG. 7.

FIG. 5 is a perspective view of the laser beam printer 1 and each of FIG. 6 and FIG. 7 is a cross sectional view of the laser beam printer 1 when the image reading unit 40 is attached after detaching the second paper supplying tray unit 4.

As shown in FIG. 5, the image reading unit 40 has an original inserting port 41 and an original discharging port 42, and is provided with a reading operation starting switch 86.

As shown in FIG. 6, the image reading unit 40 is provided with an image reading portion 43 as one example of the reading device and an original transporting roller 44 as one example of an original transporting device, in addition to the original inserting port 41 and the original discharging port 42.

As shown in FIG. 7, the image reading unit 40 is provided with a driving transmission gear train composed of an intermittent gear 62 and relay gears 63a and 63b, so that the driving force from the main body of the laser beam printer can be transmitted therethrough.

Here, the image reading unit 40 is detachably attached to the attachment portion for the second paper supplying tray unit 4 of the main body case 2. In order to attach or mount the image reading unit 40 to the main body case 2 from the upper side thereof and fix it in position with respect to the main body case 2, an attachment mechanism as shown in FIG. 8 is provided on both of the image reading unit 40 and the main body case 2.

Figure 8:
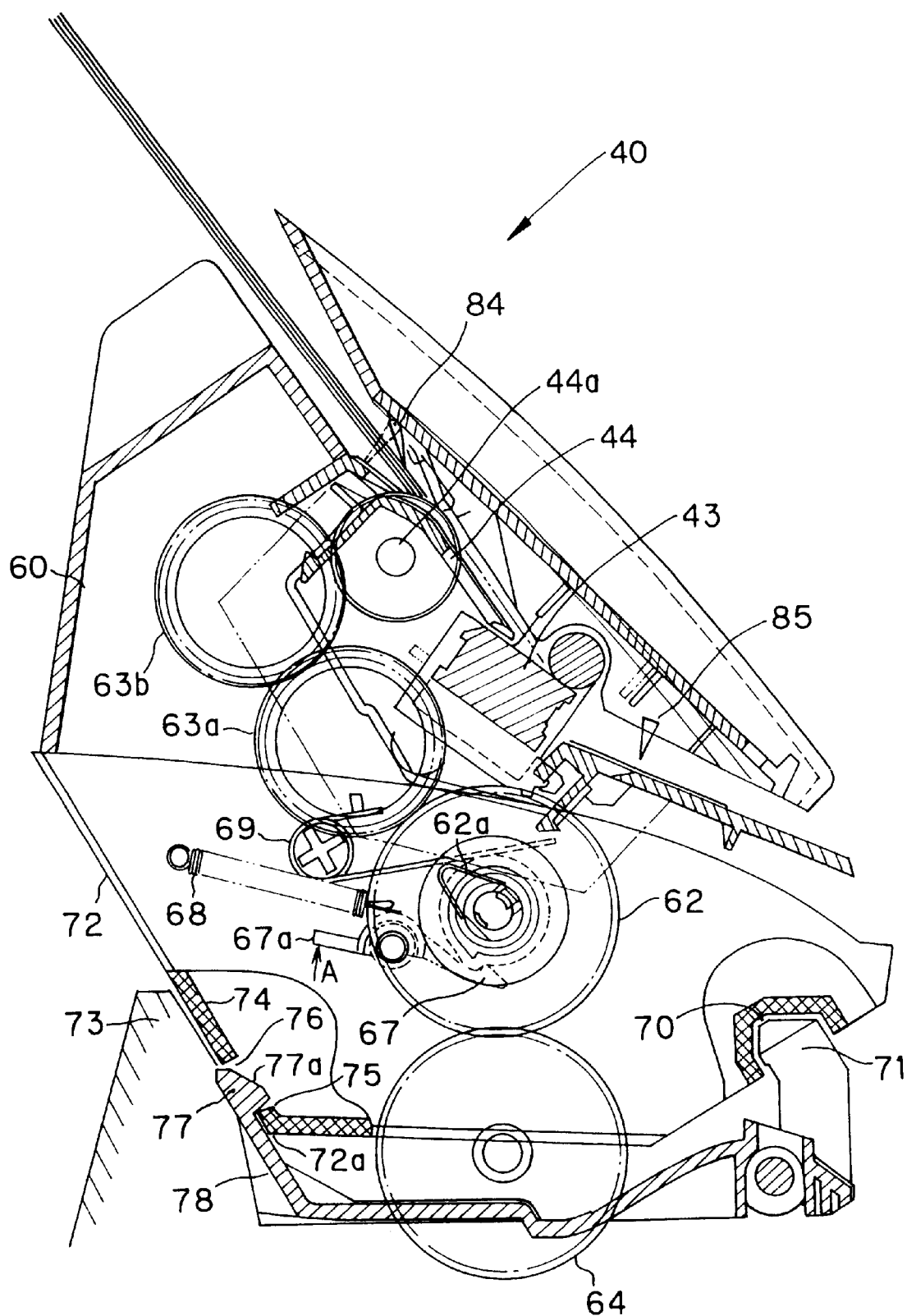
FIG. 8 is across sectional view showing a configuration of the image reading unit of FIG. 6.

Namely, as shown in FIG. 8, there are formed a pair of left and right engaging holes 70 as a concave portion opening at the lower surface thereof at a vicinity of the front edge of the lower edge portion of each of the left and right end portions of the tray case 60 as one example of an attachment device. There are formed a pair of left and right engaging protrusions 71 in a protruded shape, each of which engages with respective one of the engaging holes 70, on the main body case 2 to which the image reading unit 40 is attached.

Further, there are formed a pair of left and right engagement receiving surfaces 73 in a front-fallen and inclined state on the main body case 2 at the portions corresponding to the left and right end portions at the lower edge of the rear wall 72 of the tray case 60. There are formed a pair of left and right abutting portions 74, each of which receives respective one of the engagement receiving surfaces 73 on the tray case 60 at the lower edge of the rear wall 72 of the tray case 60. When the engaging protrusions 71 are respectively engaged with the engaging holes 70, the position in the forward, backward, left and right directions is determined, so that each engaging protrusions 71 abuts to the upper wall of respective one of the engaging holes 70. Thus, the position of the front edge portion of the image reading unit 40 in the upper and lower directions is determined. After that, since the abutting portions 74 are respectively received by the engagement receiving surfaces 73, the position of the rear edge portion of the image reading unit 40 in the upper and lower directions is determined.

On the other hand, as shown in FIG. 8, there are formed a pair of left and right hooked portions 75 and hook holes 76 on the lower edge of the rear wall 72 of the tray case 60 of the image reading unit 40. There are formed a pair of left and right elastic hooking portions 77 on the main body case 2, to which the image reading unit 40 is attached, at a position corresponding to the hooked portions 75 and the hook holes 76 at the rear edge. Each hooking portion 77 is formed on the upper edge of an arm 78. The arm 78 is elastic in forward and backward directions. There is formed a guiding surface 77a in a forward fallen shape at the front edge of the hooking portion 77. Accordingly, as the hooking portions 77 respectively enter the hook holes 76, the hooked portions 75 at the lower edge of the hook holes 76 are respectively hooked by the hooking portions 77.

When the image reading unit 40 is attached to the main body case 2 as the image reading unit 40 is put down from the upper side, if the image reading unit 40 is pushed downward while respectively engaging the left and right engaging portions 71 with the left and right engaging holes 70, a corner portion 72a at the bottom of the tray case 60 pushes the guiding surfaces 77a of the left and right hooking portions 77. Thus, the left and right hooking portions 77 are respectively engaged with the left and right hook holes 76 via an elastic deformation of the arm 78, so that the left and right hooked portions 75 are respectively hooked by the left and right hooking portions 77.

When the image reading unit 40 is to be detached from the main body case 2, if the tray case 60 is pulled upward, the left and right hooked portions 75 are easily released from the hooking portions 77. Accordingly, the left and right engaging portions 71 are easily released from the left and right engaging holes 70, so that the image reading unit 40 can be easily detached.

Next, the driving mechanism of the original transporting roller 44 equipped in the image reading unit 40 is explained.

As shown in FIG. 6 and FIG. 8, the original transporting roller 44 is rotatably fixed on the tray case 60 of the image reading unit 40 via a horizontal roller shaft 44a directed in the left and right directions. The intermittent gear 62 is fixed under the roller shaft 44a of the original transporting roller 44. At a position corresponding to the intermittent gear 62 of the main body case 2, the driving gear 64 is installed as one example of a driving device which can engage with the intermittent gear 62 in a condition that the image reading unit 40 is attached to the main body case 2. The driving gear 64 is, as shown in FIG. 4, installed such that it is partially exposed to the outer space in a condition that the image reading unit 40 is detached from the main body case 2. A hook lever 67 for hooking the intermittent gear 62 is energized by a spring 68. An output rod of an electromagnetic actuator (not illustrated in FIG. 8) is engaged with an input portion 67a of the hooking lever 67. The intermittent gear 62 for supplying the paper P is energized in a counter-clockwise direction in FIG. 8, by a protrusion 62a formed on the intermittent gear 62 and a torsion spring 69.

Therefore, when the electromagnetic actuator is turned on to be actuated, the output rod thereof moves the input portion 67a of the hooking lever 67 in a direction indicated by an arrow A in FIG. 8, so that the hooking condition between the hook lever 67 and the intermittent gear 62 is released. As a result, the intermittent gear 62 becomes in a freely rotatable condition and is rotated by engaging with the driving gear 64, so as to rotate the original transporting gear 44 though the relay gears 63a and 63b. On the other hand, when the electro-magnetic actuator is turned off, the output rod thereof moves the input portion 67a of the hooking lever 67 in a direction opposite to the direction indicated by the arrow A in FIG. 8, so that the hooking lever 67 and the intermittent gear 62 are hooked again. Then, at this hooking position, the intermittent portion of the intermittent gear 62 is opposed to the driving gear 64 as shown in FIG. 8, resulting in that the original transporting roller 44 is stopped. As described above, according to the present embodiment, by turning on or off the electromagnetic actuator provided on the side of the main body, it is possible to control the driving operation of the original transporting roller 44.

Further, the timing when the electromagnetic actuator is turned on and off is based on the outputs of an original lead edge detecting sensor 84 and an original tail edge detecting sensor 85 shown in FIG. 8. These detecting sensors 84 and 85 are constructed such that each of them is disposed in a transporting path of the original (i.e., the original image sheet) and each of them is turned on as the original abuts to each of them.

The control of the electromagnetic actuator is performed by a DC controller circuit described later only in case that the image reading unit 40 is attached to the attachment portion for the second paper supplying tray unit 4. Accordingly, in the present embodiment, there is equipped a sensor as explained below for detecting whether or not the image reading unit 40 is attached.

Figure 9:
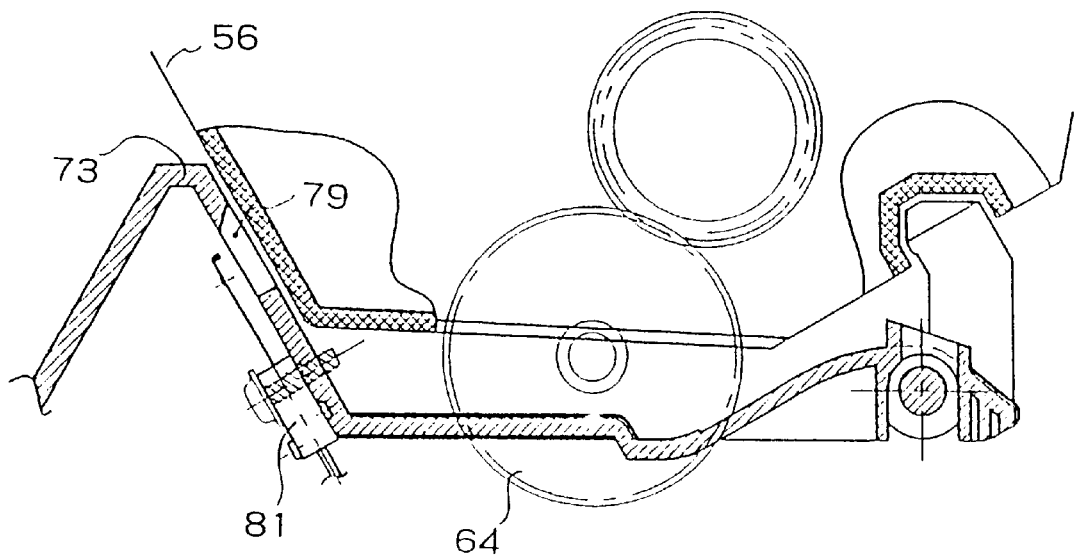
FIG. 9 is a cross sectional view showing an attachment portion of the laser beam printer of FIG. 1 in a condition that the second paper supplying tray unit is attached.
Figure 10:
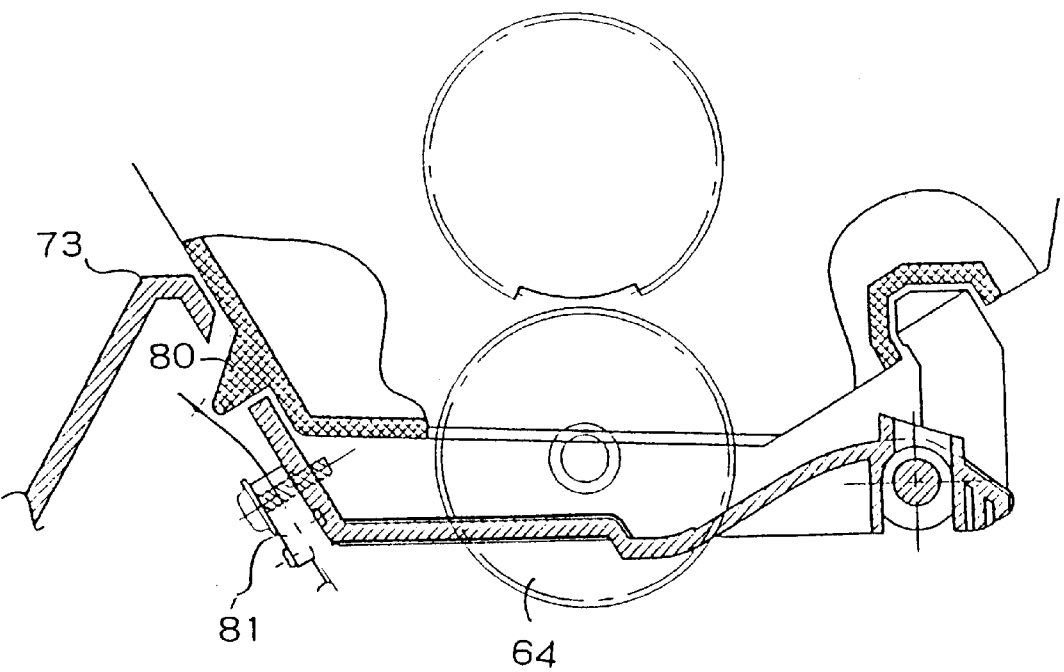
FIG. 10 is a cross sectional view of the attachment portion of the laser beam printer of FIG. 1 in a condition that the image reading unit is attached.

As shown in FIG. 9 and FIG. 10, there is a concave portion 79 other than the hook hole 76 on the receiving surface 73 of the main body case 2 at a position corresponding to the lower edge of the rear wall 72 of the tray case 60. There is a protrusion 80 as one example of an identification device at the lower edge of the tray case of the image reading unit 40 as shown in FIG. 10. The protrusion 80 pushes a reading unit detecting sensor 81 which is set in the main body case 2, and transmits to the printer main body a detection signal indicating that the image reading unit 40 is attached to the main body case. On the other hand, there is no protrusion like this on the second paper supply tray unit 4, as shown in FIG. 9, so that the detection signal is outputted only when the image reading unit 40 is attached to the attachment portion of the main body case 2.

When the printer main body receives this detection signal, the printer main body performs the paper supplying operation if the second paper supplying tray unit 4 is attached, and performs the original image reading operation if the image reading unit 40 is attached.

Figure 11:
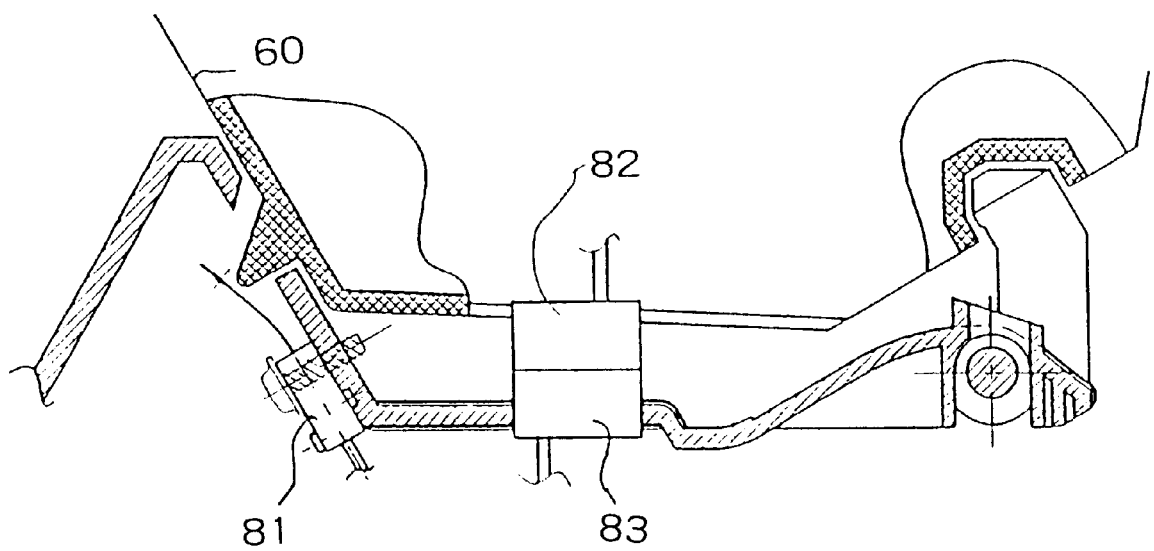
FIG. 11 is a cross sectional view of a signal transmitting portion of the attachment portion of the laser beam printer of FIG. 1 in a condition that the image reading unit is attached.

FIG. 11 shows means for transmitting signals of the image reading unit 40 to the side of the printer main body. Namely, a connector 82 fixed on the bottom surface of the case of the image reading unit 40 and a connector 83 fixed on the upper portion of the printer main body are automatically engaged with each other by one series of the tray attaching operation, so that the signals on the side of the image reading unit 40 are transmitted therethrough to the side of the printer main body.

As described above, the present embodiment is constructed such that the image reading unit 40 can be attached in place of the second paper supplying unit 4, the image reading unit 40 can be driven by the driving source provided on the side of the printer main body, and that the driving operation of the image reading unit 40 can be controlled by a controller provided on the side of the printer main body.

Therefore, it is possible to attach the image reading unit 40 quite easily without the necessity of performing a troublesome connecting operation or ensuring a layout space for the image reading unit.

Further, by the construction mentioned above, it is possible to manufacture and sell the image reading unit 40 as an optional apparatus for the laser beam printer 1, so that it is possible to reduce the cost of the laser beam printer 1 as one piece of commodity. Furthermore, this cost reduction is enhanced since no modified portion is substantially necessary on the side of the printer main body in order to attach the image reading unit 40, and since the conventional printer can be almost used as it is.

Figure 12:
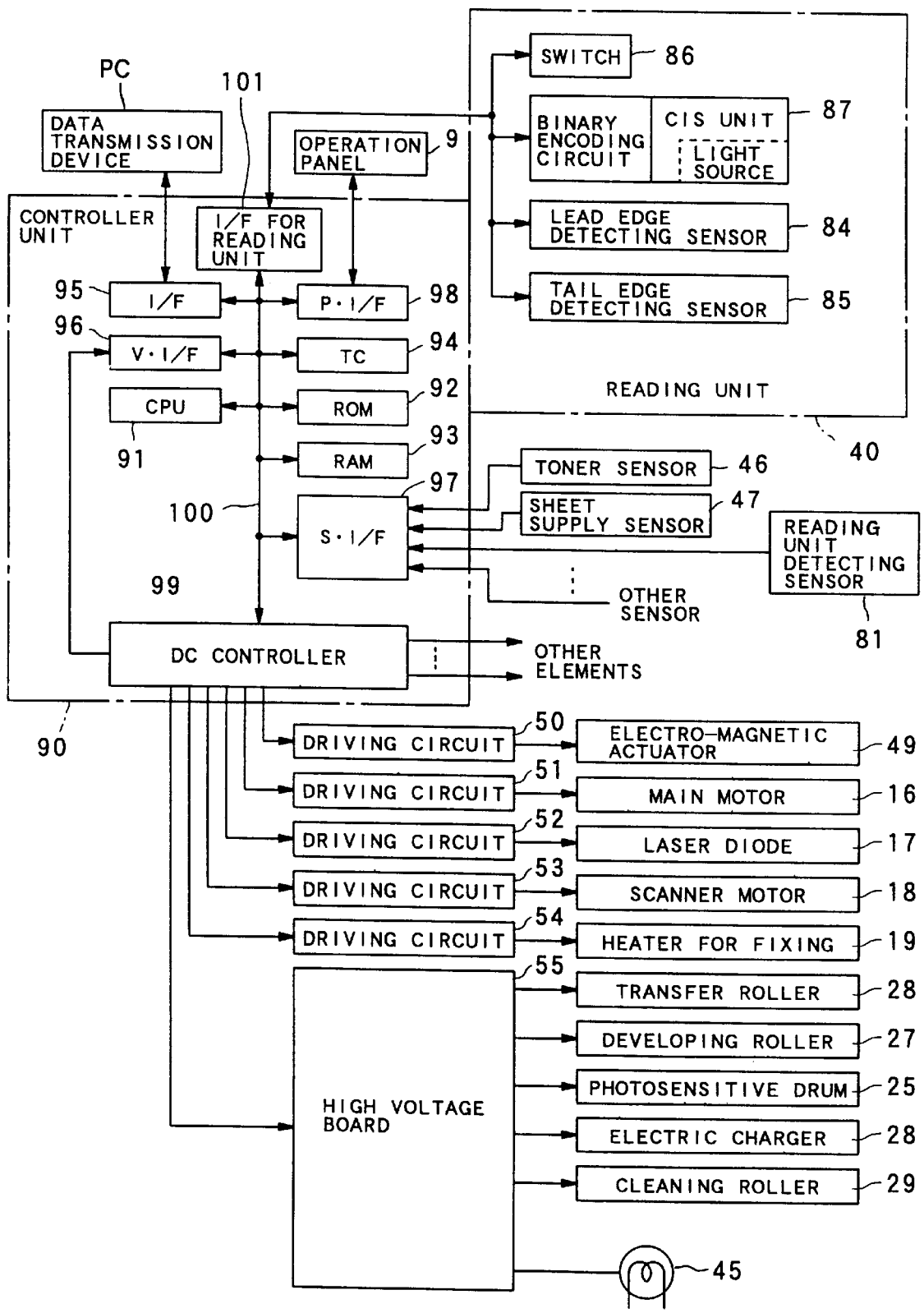
FIG. 12 is a block diagram showing an electrical configuration of a controller etc., of the laser beam printer of FIG. 1.

Next, a controller unit 90 provided in the internal of the printer main body of the laser beam printer 1 will be explained. FIG. 12 is a block diagram showing a construction of a controller unit 90.

In FIG. 12, the controller unit 90 is provided with a CPU (Central Processing Unit) 91; a ROM (Read Only Memory) 92 for storing various control programs; a RAM (Random Access Memory) 93 having various memories such as a receiving buffer and the like for receiving and storing the transmission data transmitted from an external data transmission device (PC) such as a personal computer, a host computer or the like; a timing controller circuit (TC) 94 for generating a timing signal to prescribe the timing of writing into or reading from the receiving buffer the received data; an interface (I/F) 95 for receiving the transmitted printer data; a video interface (V·I/F) having a scan buffer for sequentially outputting printer information, which is converted into bit image data, to a DC controller circuit 99; a sensor interface (S·I/F) 97 for receiving the detection signals from a toner sensor 46, a paper supply sensor 47 equipped on a downstream side of the paper supply roller at the vicinity thereof, a reading unit detecting sensor 81 for detecting whether or not the image reading unit 40 is attached to the attachment portion, and other sensors; a panel interface (P·I/F) 98 for selecting one of a recording mode and a laminate sheet making mode from an operation panel portion 9 and receiving a signal switched by the selection; and an interface 101 for the image reading unit 40 for receiving various signals from the image reading unit 40. These constitutional elements are connected to the CPU 91 as one example of the controller through a bus line 100.

The DC controller circuit 99 is connected to: a driving circuit 51 for a main motor 16 for driving a paper supplying side transporting mechanism, which includes the transporting rollers 12a and 12b, the resist rollers 13a and 13b, the photosensitive drum 25 and so on, and a discharging side transporting mechanism, which includes the heating roller 34, the pressure roller 35, the paper discharging roller 15a and 15b, a pinch roller and so on; a driving circuit 52 for the laser diode 17; a driving circuit 53 for the scanner motor 18 for driving the polygon mirror; a driving circuit 54 for the fixing heater 19 having a halogen lamp in the heating roller 54; and a high voltage board 55 for generating high voltages to the photosensitive drum 25, the transfer roller 28, the charger 26, the developing roller 27 and the cleaning roller 29 and for turning on the discharge lamp 45.

The DC controller circuit 99 is also connected to a driving circuit 50 for driving the electromagnetic actuator 49, which drives the hook lever 67 of the image reading unit 40.

In the ROM 92, there are stored various control programs for the normal operation of the laser beam printer I which is started in the recording mode, a control program for the image reading unit 40, as well as memory managing programs for managing memory capacities and leading addresses of various memories such as a font memory for storing dot pattern data for printing related to a large number of characters e.g., characters, signs, marks, symbols, a receiving data buffer in the RAM 92, a printer image memory and so on.

The image reading unit 40 is provided with: a reading start switch 86; a contact type image sensor unit 87 in the image reading portion 43; the original lead edge detecting sensor 84; and the original tail edge detecting sensor 85, and is constructed such that each signal is inputted to the CPU 91 through the interface 101.

Next, the operation of the image forming apparatus of the present invention constructed in the above described manner is explained with reference to flow charts in FIG. 13A and FIG. 13B.

Figure 13A:
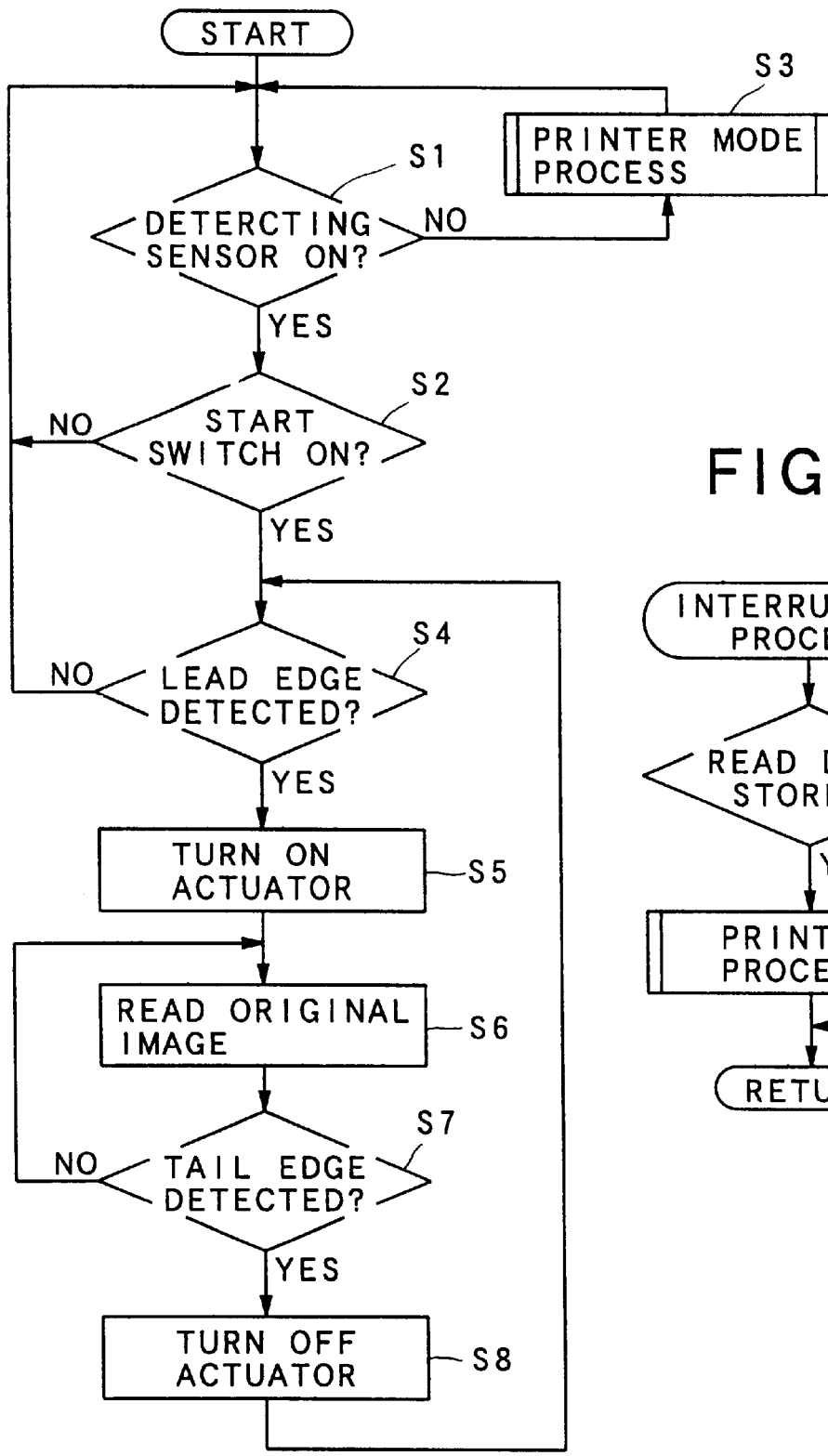
FIG. 13A is a flow chart showing an image reading process of the laser beam printer of FIG. 1.

At first, in FIG. 13A, it is judged whether or not the reading unit detecting sensor 81 is in the ON condition (Step S1). If it is not in the ON condition (Step S1: NO), the normal process in the printer mode is performed (Step S2).

Next, if it is in the ON condition (Step S1: YES), it is judged whether or not the reading start switch 86 in the image reading unit 40 is in the ON condition (Step S3). If it is not in the ON condition (Step S3: NO), it stands-by until the ON condition. However, it may be constructed such that the normal process in the printer mode is started during this standing-by condition, if a control signal indicating the normal process in the printer mode is outputted from the personal computer or the like.

Then, if the reading start switch 86 becomes in the ON condition (Step S3: YES), it is judged whether or not the lead edge of the original is detected by the original lead edge detecting sensor 84 (Step S4). If it is not detected (Step S4: NO), it stands-by until the lead edge is detected. However, it may constructed such that an error process is performed if the lead edge of the original is detected while standing by for a predetermined time duration. Alternatively or additionally, it may be constructed such that the normal process in the printer mode is preferentially performed.

On the other hand, in case that the lead edge of the original is detected (Step S4: YES), the electromagnetic actuator 49 is turned on and driven, so that the hooking condition between the hook lever 67 and the intermittent gear 62 is released, and that the intermittent gear 62 is rotated to transport the original (Step S5).

Next, it is performed to read the original image by the contact type image sensor 87 (Step S6). This image reading process is continued until the tail edge of the original is detected by the original tail edge detecting sensor 85 (Step S7).

Figure 13B:
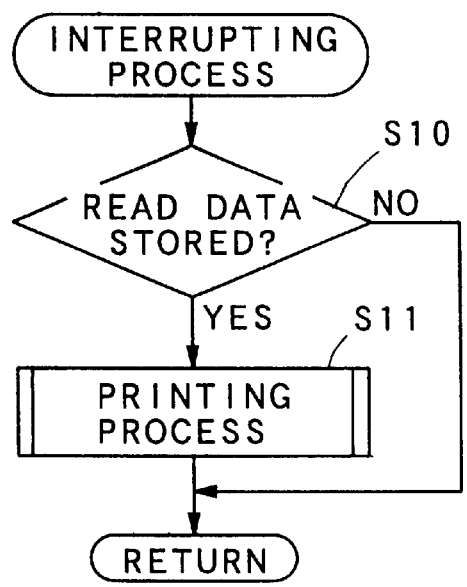
FIG. 13B is a flow chart showing a printer process of read data in the laser beam printer of FIG. 1.

Incidentally, along with this image reading process for the original, as shown in FIG. 13B, an interrupting process is executed. Namely, each time the data amount of the read data stored in the memory reaches a predetermined data amount (Step S10: YES), the printing process is executed (Step S11).

In this way, since the present embodiment is constructed such that the printing process is executed for each predetermined data amount of the read data before reading all the data of the original, it is possible to execute a speedy printing process.

Then, when the transportation of the original is completed and the tail edge of the original is detected by the original tail edge detecting sensor 85 (Step S7: YES), the electromagnetic actuator is turned off, so that the hooking condition between the hook lever 67 and the intermittent gear 62 is recovered and the transportation for the original is stopped (Step S8).

As describe above, according to the present embodiment, it is possible to execute the printing process on the paper P which is supplied from the first paper supplying tray unit 3 immediately after reading the image by the image reading unit 40, so that the copy of the read image can be speedily obtained.

Incidentally, in the present embodiment, an example in which the printing process based on the data from the personal computer is not executed while reading the image has been explained. However, the present invention is not limited to this. For example, the image reading process and the printing process based on the data from the personal computer may be executed in a time-sharing manner. Then, the printing process of the read data may be executed after all of the printing process is finished, or the printing process may be executed alternatively page by page.

By constructing in this manner, it is possible to improve the efficiency of the image forming system on the whole.

Further, by attaching the image reading unit 40 on the laser beam printer 1, it is possible to perform the image reading process by use of the driving mechanism etc., of the laser beam printer 1 as it is, so that the layout saving and the reduction in the labor for the connecting operation can be improved.

Further, since the second paper supplying tray unit 4 and the image reading unit 40 are detachably attached, by detaching or removing the second paper supplying tray unit 4 and the image reading unit 40, the lower surface side of the second paper supplying tray unit 4 and the image reading unit 40 can be opened. Thus, it is advantageous as a counter measurement for the paper jam from the first paper supplying tray unit 3.

Furthermore, since the original transporting roller 43 and the intermittent gear 62 are provided on the side of the image reading unit 40, it is possible to simplify the structure of the attachment portion of the main body case 2, and to easily attach and detach the image reading unit 40. In addition, it is possible to simplify the transmission system for transmitting the driving force from the driving gear 44 on the side of the main body case 2 to the intermittent gear 62 on the side of the image reading unit 40.

Since the printing process is performed each time the predetermined amount of data is stored as aforementioned, it is possible to output the data speedily as compared with the conventional cases. Hence, it is possible to construct the laser beam printer without any surplus or excess buffer for temporarily storing the data (e.g., RAM, SIMM) with a low cost.

In the present embodiment, the print process is executed immediately after the pushing down operation of the reading start switch. However, the present invention is not limited to this. For example, the read data may be transmitted to the personal computer or the like.

Moreover, since the hook between the image reading unit 40 and the main body is enabled by employing the elastic hook portion, it is possible to smoothly attach and detach the image reading unit 40 through the elastic deformation of the hook.

In addition, in the above embodiment, although an explanation has been made in which the present invention is applied to the laser beam printer 1, it is possible to apply the present invention in the similar manner to the printer other than the laser beam printer (e.g., an ink jet printer, a thermal printer, other printers of various types).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-253291 filed on Sep. $18^{th}$, 1997 including the specification, claims, drawings and summary is incorporated herein by reference in its entirety.

What is claimed is:

1. An image forming apparatus comprising:
    a main body unit including a controller and an image forming device for forming an image on a record medium under a control of said controller, and having an attachment portion;
    a detachable record medium supplying unit detachably attached to said attachment portion and including a record medium accommodation device for accommodating the record medium and a record medium transporting device for transporting the record medium from said record medium accommodation device; and
    a detachable image reading unit detachably attached to said attachment portion instead of said detachable record medium supplying unit and including a reading device for reading image information on an original and an original transporting device for transporting the original to said reading device.

2. An image forming apparatus according to claim 1, further comprising: a driving device for driving said record medium transporting device by engaging with said record medium transporting device when said detachable record medium supplying unit is attached to said attachment portion, and for driving said original transporting device by engaging with said original transporting device when said detachable image reading unit is attached to said attachment portion.

3. An image forming apparatus according to claim 1, wherein
    at least one of said detachable record medium supplying unit and said detachable image reading unit comprises an identification device, and
    said controller identifies whether said detachable record medium supplying unit or said detachable image reading unit is attached to said attachment portion on the basis of said identification device.

4. An image forming apparatus according to claim 1 further comprising at least one non-detachable record medium supplying unit fixedly attached to said main body unit at a position other than said attachment portion,
    said controller controlling said image forming device to form the image on the record medium supplied from said non-detachable record medium supplying unit on the basis of the image information read by said reading device when said detachable image reading unit is attached to said attachment portion.

5. An image forming apparatus according to claim 4, wherein said controller performs a process of inputting image data from said detachable image reading unit and a process of controlling said image forming device to form the image based on the inputted image data in a time-sharing manner.

6. An image forming apparatus comprising:
    a controller;
    an image forming device for forming an image on a record medium under a control of said controller; and
    a main body case for accommodating said controller and said image forming device and having an attachment portion to which a detachable record medium supplying unit and a detachable image reading unit can be alternatively and detachably attached,
    said detachable record medium supplying unit including a record medium accommodation device for accommodating the record medium and a record medium transporting device for transporting the record medium from said record medium accommodation device,
    said detachable image reading unit including a reading device for reading image information on an original and an original transporting device for transporting the original to said reading device.

7. An image forming apparatus according to claim 6, further comprising: a driving device for driving said record medium transporting device by engaging with said record medium transporting device when said detachable record medium supplying unit is attached to said attachment portion, and for driving said original transporting device by engaging with said original transporting device when said detachable image reading unit is attached to said attachment portion.

8. An image forming apparatus according to claim 6, wherein
    at least one of said detachable record medium supplying unit and said detachable image reading unit comprises an identification device, and
    said controller identifies whether said detachable record medium supplying unit or said detachable image reading unit is attached to said attachment portion on the basis of said identification device.

9. An image forming apparatus according to claim 6 further comprising at least one non-detachable record medium supplying unit fixedly attached to said main body case at a position other than said attachment portion,
    said controller controlling said image forming device to form the image on the record medium supplied from said non-detachable record medium supplying unit on the basis of the image information read by said reading device when said detachable image reading unit is attached to said attachment portion.

10. An image reading apparatus, which can be detachably attached to an attachment portion of an image forming apparatus instead of a detachable record medium supplying unit, said image forming apparatus including a controller and an image forming device for forming an image on a record medium under a control of said controller, said detachable record medium supplying unit detachably attached to said attachment portion and including a record medium accommodation device for accommodating the record medium and a record medium transporting device for transporting the record medium from said record medium accommodation device, said image reading apparatus comprising:

a reading device for reading image information on an original;

an original transporting device for transporting the original to said reading device; and an attachment device for attaching said image reading apparatus to said attachment portion.

11. An image reading apparatus according to claim 10, wherein said original transporting device is engaged with and is driven by a driving device of said image forming apparatus when said attachment device is attached to said attachment portion.

12. An image reading apparatus according to claim 10, further comprising an identification device for identifying said image reading apparatus from said detachable record medium supplying unit when said attachment device is attached to said attachment portion.

* * * * *